(12) United States Patent
Allos

(10) Patent No.: US 9,610,876 B2
(45) Date of Patent: Apr. 4, 2017

(54) VEHICLE SEAT PROTECTOR

(71) Applicant: Kristian Allos, El Cajon, CA (US)

(72) Inventor: Kristian Allos, El Cajon, CA (US)

(*) Notice: Subject to any disclaimer, the term of this patent is extended or adjusted under 35 U.S.C. 154(b) by 0 days.

(21) Appl. No.: 14/269,530

(22) Filed: May 5, 2014

(65) Prior Publication Data
US 2015/0314717 A1 Nov. 5, 2015

(51) Int. Cl.
B60N 2/60 (2006.01)
B60N 2/44 (2006.01)

(52) U.S. Cl.
CPC ........ B60N 2/60 (2013.01); B60N 2002/4405 (2013.01)

(58) Field of Classification Search
CPC .................. B60N 2/60; B60N 2002/4405
USPC ........ 297/182, 188.06, 219.1, 228.1, 228.12, 297/397, 452.63
See application file for complete search history.

(56) References Cited

U.S. PATENT DOCUMENTS

| 2,227,180 | A | * | 12/1940 | Falk | 297/223 |
|---|---|---|---|---|---|
| 2,953,288 | A | * | 9/1960 | Peterson | 224/42.11 |
| 3,292,973 | A | * | 12/1966 | Cogut | 297/397 |
| 4,600,238 | A | | 7/1986 | Goodford | |
| 4,676,549 | A | | 6/1987 | English | |
| 4,723,814 | A | | 2/1988 | Hunt | |
| D307,370 | S | | 4/1990 | Bailey et al. | |
| 5,816,654 | A | * | 10/1998 | Ellis | 297/284.5 |
| 5,906,413 | A | * | 5/1999 | Yang | 297/284.5 |
| 6,079,784 | A | * | 6/2000 | Peachey | 297/284.5 |
| 6,089,659 | A | * | 7/2000 | Toyota | A47C 31/11 24/116 A |
| 6,309,017 | B1 | | 10/2001 | Middleton | |
| 6,382,720 | B1 | | 5/2002 | Franklin et al. | |
| D500,623 | S | | 1/2005 | Jones | |
| 7,357,452 | B2 | | 4/2008 | Pollack | |
| 7,686,392 | B2 | | 3/2010 | Kenny | |
| 7,726,735 | B2 | * | 6/2010 | Resendez | 297/228.11 |
| 7,931,335 | B1 | | 4/2011 | Siklosi et al. | |
| 2002/0067063 | A1 | * | 6/2002 | Taborro | 297/397 |
| 2007/0145797 | A1 | | 6/2007 | Itakura | |
| 2007/0257533 | A1 | | 11/2007 | Resendez | |
| 2008/0179926 | A1 | | 7/2008 | Kushner | |
| 2010/0148560 | A1 | * | 6/2010 | MacPherson | 297/397 |
| 2011/0049949 | A1 | | 3/2011 | Basmaji et al. | |
| 2011/0140490 | A1 | | 6/2011 | Swanson | |

FOREIGN PATENT DOCUMENTS

| CA | 2 489 607 | 6/2006 |
|---|---|---|
| CA | 2 531 816 | 7/2007 |
| EP | 1 359 052 | 11/2003 |

* cited by examiner

Primary Examiner — Timothy J Brindley
(74) Attorney, Agent, or Firm — Harness, Dickey & Pierce, P.L.C.

(57) ABSTRACT

A protector for a vehicle seat back has a foldable base including at least one rigid member and at least bendable member. A mechanism is on the foldable base to enable the base to be secured to the vehicle seat back by a headrest. The at least one rigid member and at least one bendable member form fit around a top portion of the vehicle seat back to protect the upholstery on the seat back against rubbing, chaffing, scrapping or friction by a belt.

18 Claims, 2 Drawing Sheets

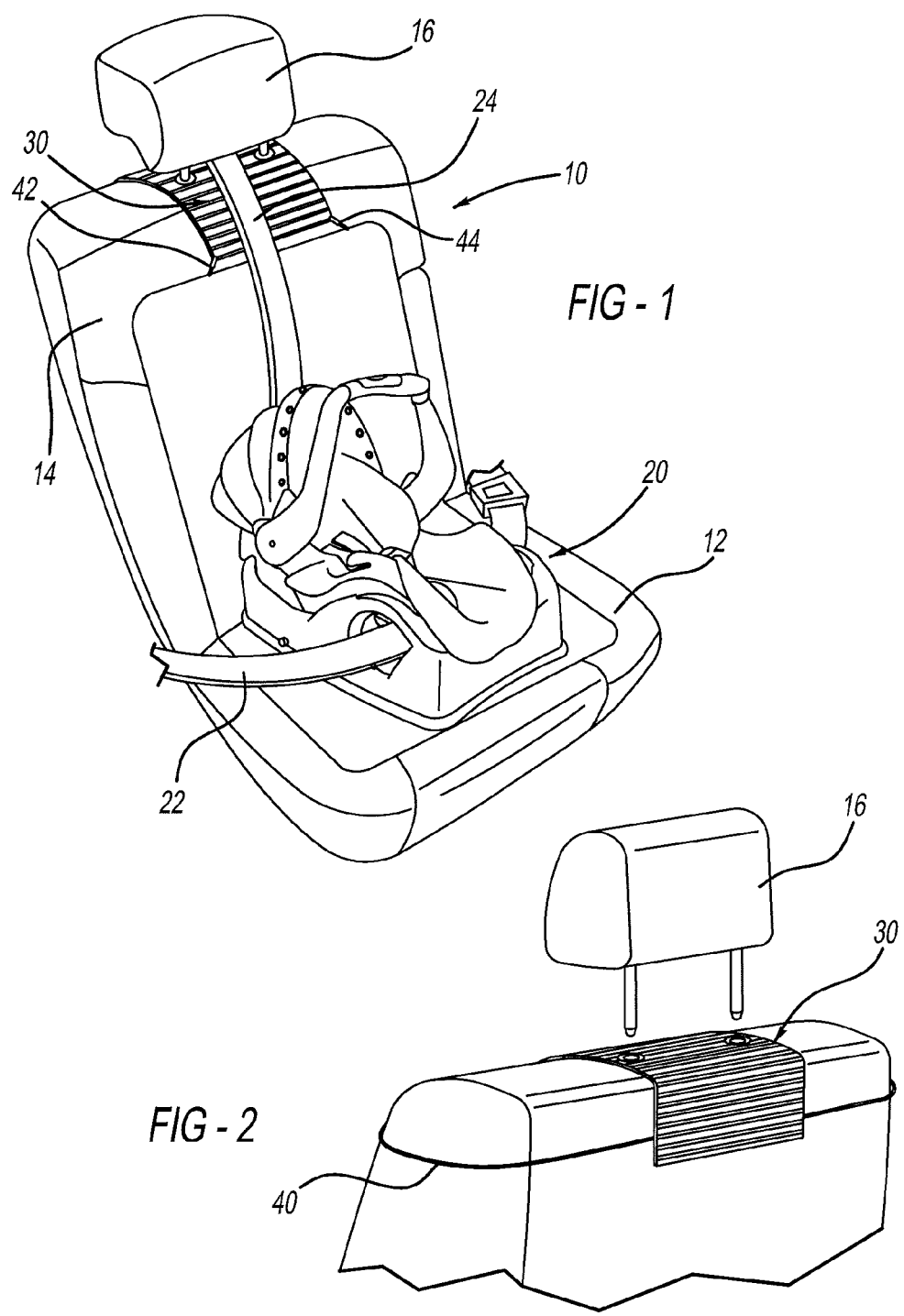

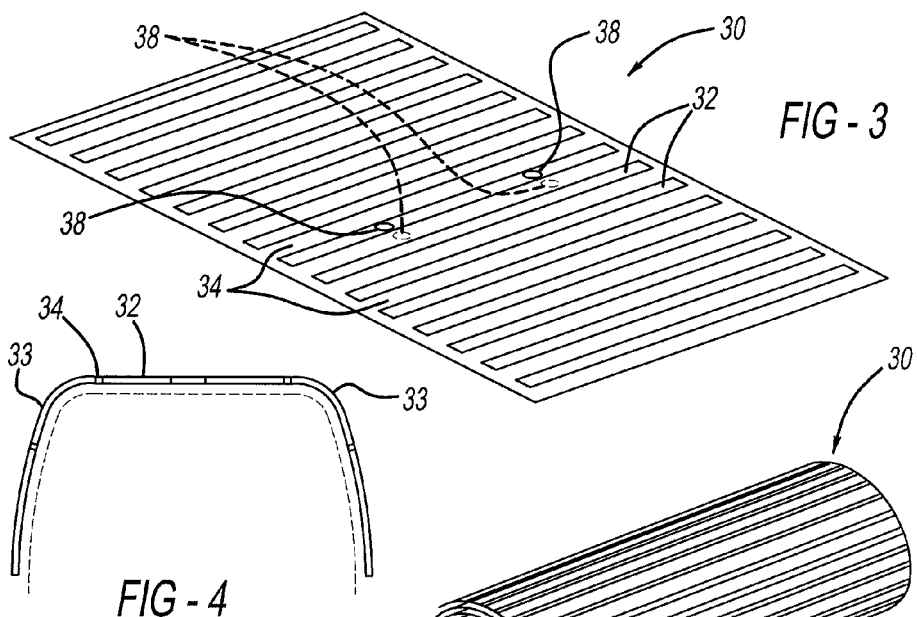
FIG - 3
FIG - 4
FIG - 5
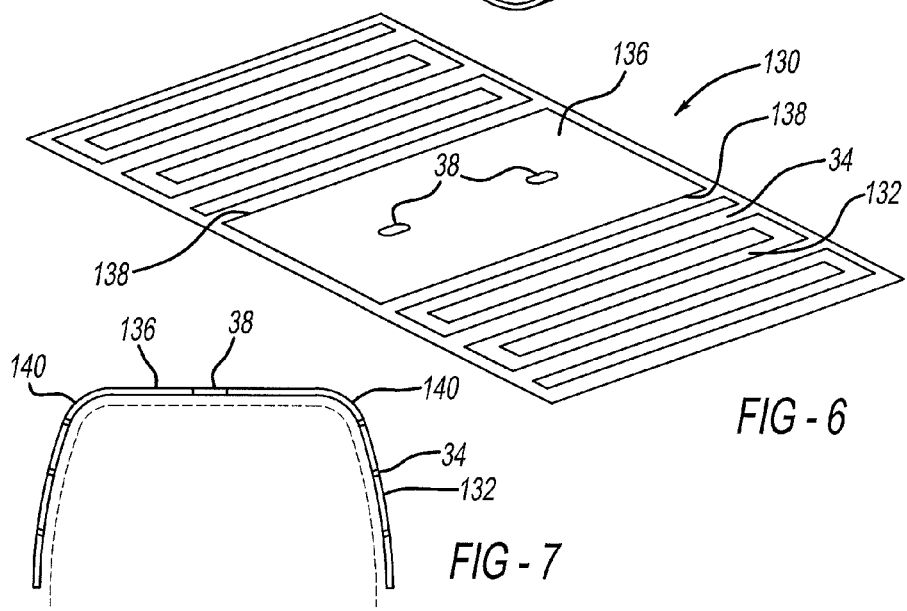
FIG - 6
FIG - 7

VEHICLE SEAT PROTECTOR

FIELD

The present disclosure relates to vehicles and, more particularly, to protection of upholstery covers utilized on the vehicle seats when a child seat is secured to the vehicle seat.

BACKGROUND

The cost of a vehicle, especially a luxury vehicle, continues to rise. Also, in luxury vehicles, the interior upholstery, while being aesthetically pleasing, is also expensive. Additionally, it is expensive to replace or repair the upholstery in the vehicle. Thus, it is desirable to maintain the upholstery as close to its original condition as possible. When the upholstery is leather, the leather has a tendency to scratch or scuff when objects rub against it. Specifically, when a child car seat or the like is positioned on top of the vehicle seat, there is always the possibility of scratching, scuffing or damaging the leather upholstery cover. Additionally, to maintain the child car seat on the vehicle seat, it is desirable to position a belt or strap from the child car seat to the rear of the seat or the back deck of the vehicle. In doing so, the belt or strap is positioned over top the free end of the vehicle seat. Due to the rubbing or the like of the strap against the top portion of the seat back, the leather may become scratched, scuffed or otherwise damaged by the child seat strap. Thus, the present disclosure provides a device for eliminating the scratching, scuffing or damaging of the vehicle seat back upholstery.

The present disclosure provides the art with a protecting device that is durable and is foldable for easy storage. The present protector is capable of forming around the free end of the vehicle seat back. The present disclosure provides a protector that is rigid while is also capable of folding into a small package for storage. Additionally, the present disclosure enables the protector to form fit various types of vehicle seat backs.

SUMMARY

Accordingly to a first aspect of the disclosure, a vehicle seat protector comprises a foldable base including at least one rigid member and at least one bendable member. A mechanism is on the foldable base to enable the base to be secured to a vehicle seat back by a head rest. The at least one rigid member and at least one bendable member fit around a top portion of the vehicle seat back to protect upholstery on the top portion of the vehicle seat back against rubbing, chaffing, friction or the like by a belt or strap. The base includes a plurality of rigid members with a plurality of bendable members positioned between adjacent rigid members. The base can be rolled into a cylinder for easy storage. The plurality of rigid members can have a desired width and thickness. The plurality of rigid members may also have different widths. A hold down device may be coupled with the base to maintain the base in position on the top portion of the seat back. The mechanism to secure the seat includes a pair of apertures in the base. The apertures are formed on the at least one rigid member or the at least one bendable member. The at least one rigid member has an overall rectangular configuration with a planar body. The at least one rigid member may be curved.

According to a second embodiment of the disclosure, a vehicle seat with a protector comprises a seat bottom and a seat back. The seat back has a first free end and a second end coupled with the seat bottom. A head rest is coupled with the free end of the seat back. A protector includes a foldable base including at least one rigid member and at least one bendable member. A mechanism is on the foldable base to enable the base to be secured to a vehicle seat back by a head rest. The at least one rigid member and at least one bendable member fit around a top portion of the vehicle seat back to protect upholstery on the top portion of the vehicle seat back against rubbing, chaffing, friction or the like by a belt or strap. The base includes a plurality of rigid members with a plurality of bendable members positioned between adjacent rigid members. The base can be rolled into a cylinder for easy storage. The plurality of rigid members can have a desired width and thickness. The plurality of rigid members may also have different widths. A hold down device may be coupled with the base to maintain the base in position on the top portion of the seat. The mechanism to secure the protector device with the seat back includes a pair of apertures in the base. The apertures are formed on the at least one rigid member or the at least one bendable member. The at least one rigid member has an overall rectangular configuration with a planar body. The at least one rigid member may be curved.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective view of a vehicle car seat.

FIG. 2 is an enlarged perspective view of a top portion of the vehicle car seat back with the head rest removed.

FIG. 3 is a perspective view of the protector.

FIG. 4 is a cross section view of a line IV-IV of FIG. 2

FIG. 5 is a perspective view of a collapsed or roll up protector.

FIG. 6 is a perspective view of a second embodiment of the disclosure.

FIG. 7 is a cross section view of FIG. 6 positioned on a top portion of a vehicle seat.

DETAILED DESCRIPTION

Turning to FIG. 1, a vehicle seat is illustrated and designated with the reference numeral 10. The seat includes a seat bottom 12 and a seat back 14. Also, a head rest 16 is attached to the free end of the top portion of the seat back 14. A child's safety seat 20 is illustrated on the vehicle seat 10. Ordinarily, the child seat 20 includes a strap 22 that secures with latches positioned between the seat bottom 12 and seat back 14. Also, the child seat 20 includes a strap 24 that is coupled with a latch positioned on the rear of the seat back 14 or the rear window deck or the like. The belt 24 passes underneath the headrest 16 and rest on the free end of the seat back 14. A protector 30 is illustrated on the vehicle seat back 14. The belt 24 rests on the protector 30.

Turning to FIG. 3, the protector 30 is illustrated on the free end of the seat back 14 with the head rest removed. The protector 30 has an overall rectangular shape and is formed by at least one rigid member 32. Ordinarily, there is a plurality of rigid members 32 in the rectangular protector 30.

At least one, and preferably a plurality of, bendable members 34 are positioned between adjacent rigid members 32. Together, the rigid members 32 and bendable members 34 form the rectangular protector 30.

The rigid members 32 are generally manufactured from a rigid material such as plastic. Also, a material, such as wood or a composite could be utilized. The rigid members 32, individually, have an overall rectangular shape. The length of the rigid members is generally the same. The rigid members 32 may have a desired width and thickness. In FIG. 3, all of the widths of the rigid members 32 are illustrated as being the same. However, the width of the rigid member may be varied and thus different widths may be presented of the rigid members. Generally, the rigid members 32 are planar and the width surfaces are parallel to one another. However, a curved rigid member 33, illustrated in FIG. 4, may be utilized to position the protector about the top of the seat back 14.

The bendable members 34 may be cloth material having the rigid members 32 secured with the bendable members. Also, the bendable members 34 could be of an elastic material and be bonded or molded with the rigid material members 32. Further, the bendable materials 34 could be a thread or a cord and pass through the rigid members 32 like a retractable blind. The bendable members 34 enable the protector 30 to be form fit onto the top portion of the seat back 14.

The rigid members 32 and bendable members 34 may be rolled into a cylinder like that illustrated in FIG. 5. Thus, the protector 30 may be easily stored in a glove box or the like until use is needed.

Additionally, a pair of apertures 38 is formed in either the rigid member 32 or the bendable member 34. The apertures 38 enable passage of the post of the headrest into the free end of the seat back 14. Thus, the protector 30 is retained onto the seat back 14 by the headrest 16 as seen in FIG. 2.

A securement member 40 may be secured to the protector 30. The securement member 40 may be an elastic band or the like. The securement member 40 may be positioned around the circumference of the seat back 14 to further enhance retention of the protector 30 on the seat back 14.

A pair of clips 42, 44 are attached to the protector 30. The clips 42, 44 may be of the alligator or the like clips. These clips are present to hold up already available chair protectors that are positioned onto the seat. Thus, the clips hold up the top of the seat protector and maintain the seat protector in position.

Turning to FIGS. 6 and 7, another embodiment of the disclosure is illustrated. Here, the elements that are the same as previously described will be designated with the same reference numeral. The difference in this embodiment lies in the different widths of the rigid member.

The protector 130 includes a plurality of rigid members 132 and bendable members 34. A central rigid member 136 is centrally positioned on the protector 130. The central rigid member 136 has a desired width that extends beyond the width of the top portion of the seat back 14 as illustrated in FIG. 7. Edges 138 of the central rigid member 136 include curve portions 140. The curved portions 140 are continuous with the body portion 142 and provide for the form fit of the protector 130 onto the seat back 14. The central member 136 includes the pair of apertures 38 to receive the headrest 16. The bendable members 34 are like those previously described.

The description of the disclosure is merely exemplary in nature and thus, variations that do not depart from the gist of the disclosure are intended to be within the scope of the disclosure. Such variations are not to be regarded as a departure from the spirit and scope of the disclosure.

What is claimed is:

1. A vehicle seat protector comprising:
   a foldable base having a desired configuration defining an area including at least one rigid member and at least one bendable member in the defined area of the configuration;
   a mechanism within the configuration area on the foldable base to enable the base to be secured to the vehicle seat by a head rest, the mechanism positioned within one of the at least one rigid member to enable passage of the head rest and the at least one rigid member and at least one bendable member fitting around a top portion of the vehicle seat where the head rest is mounted to a seat back to protect upholstery on the top portion of the seat against rubbing or friction by a belt.

2. The vehicle seat protector of claim 1, wherein the base includes a plurality of rigid members with a plurality of bendable members, a bendable member positioned between adjacent rigid members.

3. The vehicle seat protector of claim 1, wherein the base can be rolled into a cylinder for storage.

4. The vehicle seat protector of claim 1, further comprising a hold down device for maintaining the base in position on the top portion of the seat.

5. The vehicle seat protector of claim 1, wherein the mechanism for securing to the seat includes a pair of apertures to secure the vehicle seat protection to the head rest.

6. The vehicle seat protector of claim 5, wherein the pair of apertures is formed in the at least one rigid member or at least one bendable member.

7. The vehicle seat protector of claim 1, wherein the at least one rigid member has an overall rectangular configuration with a planar body.

8. The vehicle seat protector of claim 7, wherein a portion of the at least one rigid member is curved for conforming to the top of the seat back.

9. The vehicle seat protector of claim 2, wherein the plurality of rigid members have an overall rectangular configuration with a planar body.

10. The vehicle seat protector of claim 9, wherein a portion of the at least one rigid member is curved for conforming to the top of the seat back.

11. A vehicle seat protector comprising:
    a foldable base including a plurality of rigid members and at least one bendable member, the at least one bendable member positioned between adjacent rigid members, the plurality of rigid members can have a desired thickness and width and the at least one bendable member having a desired width; and
    a mechanism on the foldable base to enable the base to be secured to the vehicle seat by a head rest, the mechanism positioned on the at least one bendable member between the adjacent rigid members to enable passage of the head rest and the plurality of rigid members and at least one bendable member fitting around a top portion of the vehicle seat where the head rest is mounted to a seat back to protect upholstery on the top portion of the seat against rubbing or friction by a belt.

12. The vehicle seat protector of claim 11, wherein the plurality of rigid members have different widths.

13. A protector and a vehicle seat comprising:
    a seat bottom;
    a seat back having a first free end and a second end coupled with the seat bottom;

a head rest coupled with the free end of the seat back;
a protector comprising:
a foldable base including at least one rigid member and at least one bendable member, the at least one rigid member has an overall rectangular configuration with a planar body; and
a mechanism on the foldable base to secure the base to the vehicle seat back by the head rest, the mechanism positioned on the at least one rigid member to enable passage of the head rest and the at least one rigid member and at least one bendable member fitting around a top portion of the vehicle seat back free end where the head rest is coupled with the seat back to protect upholstery on the top portion of the seat back against rubbing or friction by a belt.

14. The vehicle seat protector of claim 13, wherein the base includes a plurality of rigid members with a plurality of bendable members, a bendable member positioned between adjacent rigid members.

15. The vehicle seat protector of claim 14, wherein the plurality of rigid members have different widths.

16. The vehicle seat protector of claim 13, further comprising a hold down device for maintaining the base in position on the top portion of the seat.

17. The vehicle seat protector of claim 13, wherein the mechanism for securing to the seat includes a pair of apertures to secure the vehicle seat protector to the head rest.

18. The vehicle seat protector of Claim 13, wherein a portion of the at least one rigid member is curved for conforming to the top of the seat back.

* * * * *